United States Patent
Hunt et al.

(10) Patent No.: US 8,006,686 B2
(45) Date of Patent: Aug. 30, 2011

(54) HIGH EFFICIENCY COMBUSTION STOVE

(76) Inventors: Larry Hunt, Coral Springs, FL (US);
Henry B. Schur, Hallandale Beach, FL (US)

( * ) Notice: Subject to any disclaimer, the term of this patent is extended or adjusted under 35 U.S.C. 154(b) by 883 days.

(21) Appl. No.: 12/005,212

(22) Filed: Dec. 27, 2007

(65) Prior Publication Data

US 2009/0165772 A1    Jul. 2, 2009

(51) Int. Cl.
*A47J 37/07* (2006.01)
(52) U.S. Cl. .................... 126/25 R; 126/9 R; 126/26
(58) Field of Classification Search ............. 126/25 R, 126/30, 9 R, 58, 59, 77, 15 R, 26
See application file for complete search history.

(56) References Cited

U.S. PATENT DOCUMENTS 3,270,737 A * 9/1966 Horine .................. 126/25 B

* cited by examiner

*Primary Examiner* — Alfred Basichas
(74) *Attorney, Agent, or Firm* — Robert J. Van Der Wall

(57) ABSTRACT

The invention is a stove that is portable, has a double walled external structure for the passage of air used in combustion of the fuel, which air also maintains the external surface at a cool enough temperature that it can be touched, and which air flow prevents the waste of heat laterally to the ambient air from a hot outer surface. This increases cooking efficiency, because almost all heat that reaches the air flow between the two walls is drawn right into the combustion chamber in the form of preheated air by reason of the chimney effect. Thus almost no heat can escape the outside wall except by reaching the cooking pot bottom and pot sides after passing out the cover vents as exhaust. The stove is preferably powered with coal, and uses about half as much coal as a conventional coal fired stove resulting from cooking efficiency.

14 Claims, 5 Drawing Sheets

HIGH EFFICIENCY COMBUSTION STOVE

BACKGROUND OF THE INVENTION

1. Field of the Invention

The present invention relates to the general field of heating apparatus, such as stoves for cooking. More specifically, it concerns a stove that combines cooking with a combustion source of heat such as coal and very high efficiency in doing so. In fact, the efficiency is so high that consumption of coal in the invention is a little more than half of that in prior art coal fired stoves. The invention is further distinguished from prior art coal fired stoves by being portable and cool enough to hold with bare hands. The efficiency and cool outer surface both result from a double walled exterior structure through which all combustion air is ingested.

2. Description of the Prior Art

The art and science of cooking goes back many thousands of years. Art work by cavemen shows knowledge of cooking with fire. When coal was discovered, a highly concentrated combustible fuel source that provided very high temperatures with slow fuel consumption became available. Over time, it was learned that using coal for cooking dictated construction of cooking apparatus from materials that could withstand high temperatures, such as iron and steel.

But iron and steel have two significant drawbacks when viewed in the context of the present invention. First of all, they readily absorb radiated and conducted heat, and in turn radiate that heat to the ambient atmosphere. Second, they make the cooking apparatus very heavy. The result is significant wasteful loss of heat that is intended for cooking, and essentially no portability.

It is well known that hot air is less dense than cold air. This causes hot air such as created by a combustion source to rise. In a closed structure containing a heat source and having openings at the bottom and at the top, a tower of rising air is created. This phenomenon is known as the chimney effect.

Another well known physical principle is that the velocity of a gas such as air passing through a walled structure such as a cylinder increases as the cross section of the structure decreases. Thus if the structure is a cylinder, as its diameter decreases, the velocity of the air increases. The presence of a throat, or narrowed cross section, creates what is known as a venturi.

It is known in the prior art to make heat containing structures with a double walled construction. Two examples of that are U.S. Pat. Nos. 6,761,160 and 5,203,316. The latter is a double walled oven. Once, the double walled construction was in part done to make the outer wall cooler to the touch, U.S. Pat. No. 5,921,229. But so far as is currently known to the present inventors, the combination of chimney effect, a venturi, and a double walled construction has never been employed in a stove to increase the efficiency of the heating or cooking. Efficiency is increased because the combustion chamber is surrounded by a double walled structure through which all the combustion air moves, preheating it, and preventing the loss of nearly all the heat from escaping laterally. Rather nearly all heat generated by combustion is radiated to the bottom of the cooking pot or exhausted along the pot's walls to heat it by conduction.

SUMMARY OF THE INVENTION

Bearing in mind the foregoing, it is a principal object of the present invention to combine the principles of the chimney effect, a venturi, and a double walled construction to both increase the heating efficiency and maintain the outer wall of a stove cool enough to touch.

It is a related object of the present invention to use the increased efficiency to economize on the consumption of fuel.

Given that an efficient combustion cooking apparatus will necessarily be completely enclosed making it difficult or almost impossible to add fuel during the cooking of a meal, it is a further related object of the invention to employ the efficiency of the present invention to increase the cooking time available for a given amount of fuel.

It is another object of the present invention to employ the efficiency and relatively cool outer wall of the present invention to make the apparatus portable, even movable when in use.

An additional object of the present invention to make the apparatus easy to clean by providing an open bottom through which expended fuel can drop, and with a grate disposed at the bottom of a handle equipped removable bucket to readily dump out remaining expended and unexpended fuel.

Other objects and advantages of the present invention will apparent to those skilled in the art upon consideration of the following descriptions and the appended drawings.

In accordance with a major aspect of the present invention, there is provided a cooking apparatus that is portable, has a double walled external structure for the passage of air used in combustion of the fuel, which air also maintains the external surface at a cool enough temperature that it can be touched, and which air flow prevents the waste of heat laterally to the ambient air from a hot outer surface thereby contributing significantly to cooking efficiency of the apparatus. Basically almost all heat that reaches the air flow between the two walls is drawn right into the combustion chamber in the form of preheated air by reason of the chimney effect. Thus almost no heat can escape the outside wall except by reaching the cooking pot bottom and pot sides after passing out the cover vents as exhaust as intended. The device also includes an externally adjustable air flow regulator disposed within the double wall structure. The stove is preferably powered with coal, and uses approximately half as much coal as a conventional coal fired stove because of its cooking efficiency.

More specifically the structure of the invention is comprised of an outside cylindrical wall, an inside wall in the shape of a truncated cone, a bottom having a large opening in the center, and a vented removable cover. Combustion air is drawn in a multiplicity of rectangular ports from the chimney effect of the combustion further down line. The air passes between the outside wall and cone shaped inside wall after entering the ports. This preheats the air, but it still keeps the outside wall cool enough to handle with bare hands.

The cover includes a multiplicity of vents, from which hot air is exhausted. The cover is an annular ring with a large open center is where the bottom of a pot containing food is exposed to the radiation of the fire and the hot air inside the stove. The hot air then exits the vents and heats the outside of the walls of the pot. Disposed within the cone is a removable bucket described next.

The removable bucket is comprised of a tapered portion at its top and a lower cylindrical portion. The cylindrical portion is perforated by a plurality of apertures. When the removable bucket is disposed in the stove, a part of the cylindrical portion projects beneath the bottom of the cone. The apertures are thus exposed to the air flow between the outside wall and the cone. At the intersection of the tapered portion and the cylindrical portion of the bucket is disposed a grate. The grate supports a combustible fuel such as coal in the air flow that passes through apertures. The grate represents the narrowest cross section of the entire route of air flow through the apparatus, and thus acts as a venturi, which increases the temperature at the point of combustion.

BRIEF DESCRIPTION OF THE DRAWINGS

Various other objects, advantages, and features of the invention will become apparent to those skilled in the art from the following discussion taken in conjunction with the appended drawings, in which.

DETAILED DESCRIPTION OF THE PREFERRED EMBODIMENTS

Figure 1:
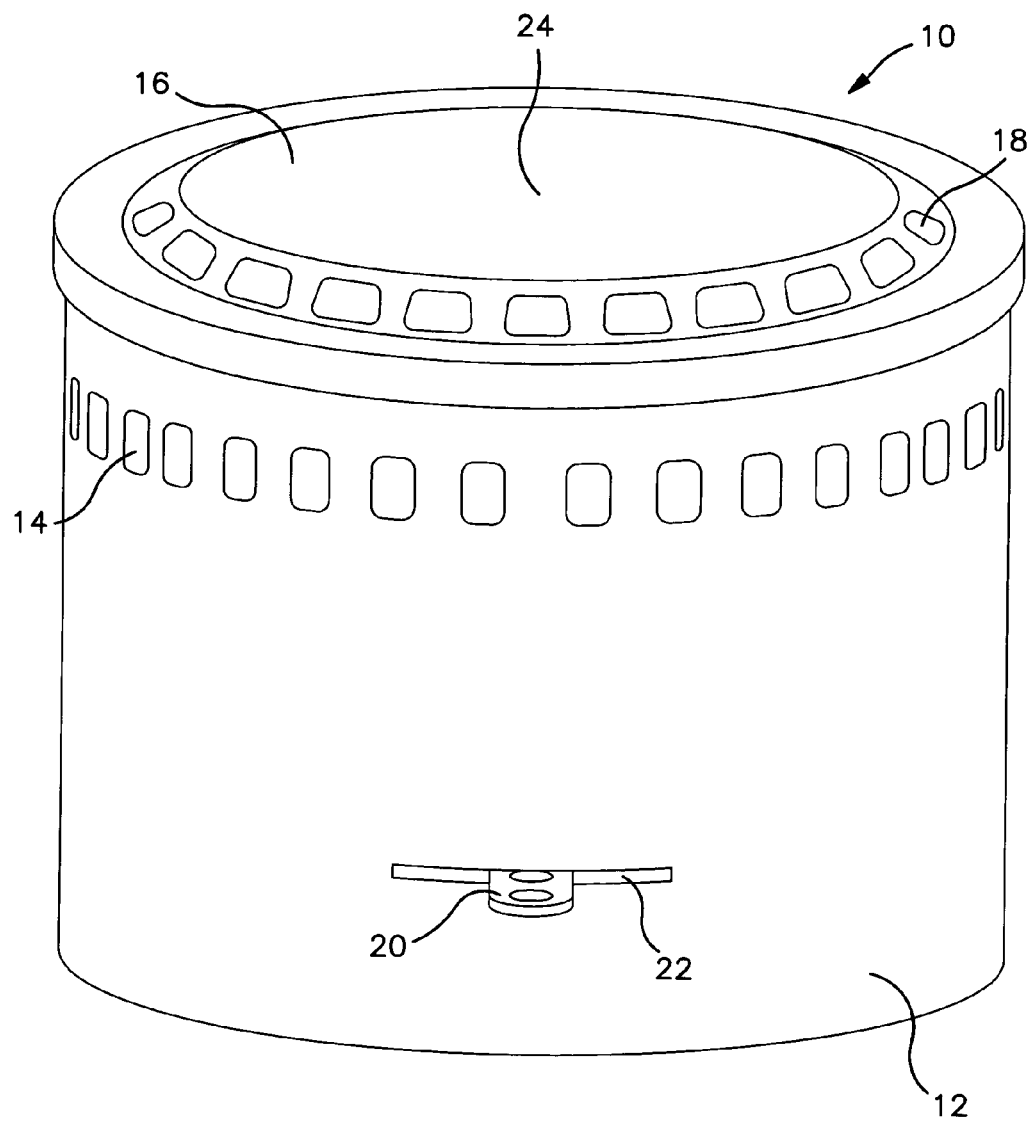
FIG. 1 is a perspective front view of the high efficiency combustion stove of the present invention.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various figures are designated by the same reference numerals.

In summary, the invention is a cooking apparatus that is portable, has a double walled external structure for the passage of air used in combustion of the fuel, which air also maintains the external surface at a cool enough temperature that it can be touched, and which air flow prevents the waste of heat to the ambient air from a hot outer surface thereby contributing significantly to cooking efficiency of the apparatus. The device also includes an externally adjustable air flow regulator disposed within the double wall structure. The stove is preferably powered with coal, and uses approximately half as much coal as a conventional coal fired stove because of its cooking efficiency.

FIG. 1 is a perspective front view of the high efficiency combustion stove 10 of the present invention. Seen is the outer wall 12, rectangular ports 14, removable cover 16, and air flow regulator adjusting lever 20 projecting through adjusting slot 22. The cover 16 includes a multiplicity of exhaust vents 18, from which hot air is exhausted. The cover 16 is actually an annular ring. The large open center 24 is where the bottom of the pot (not shown until FIG. 5) containing food is exposed to the radiation of the fire and the hot air inside the stove. The hot air then exits the vents 18 and heats the outside walls of the pot.

Figure 2:
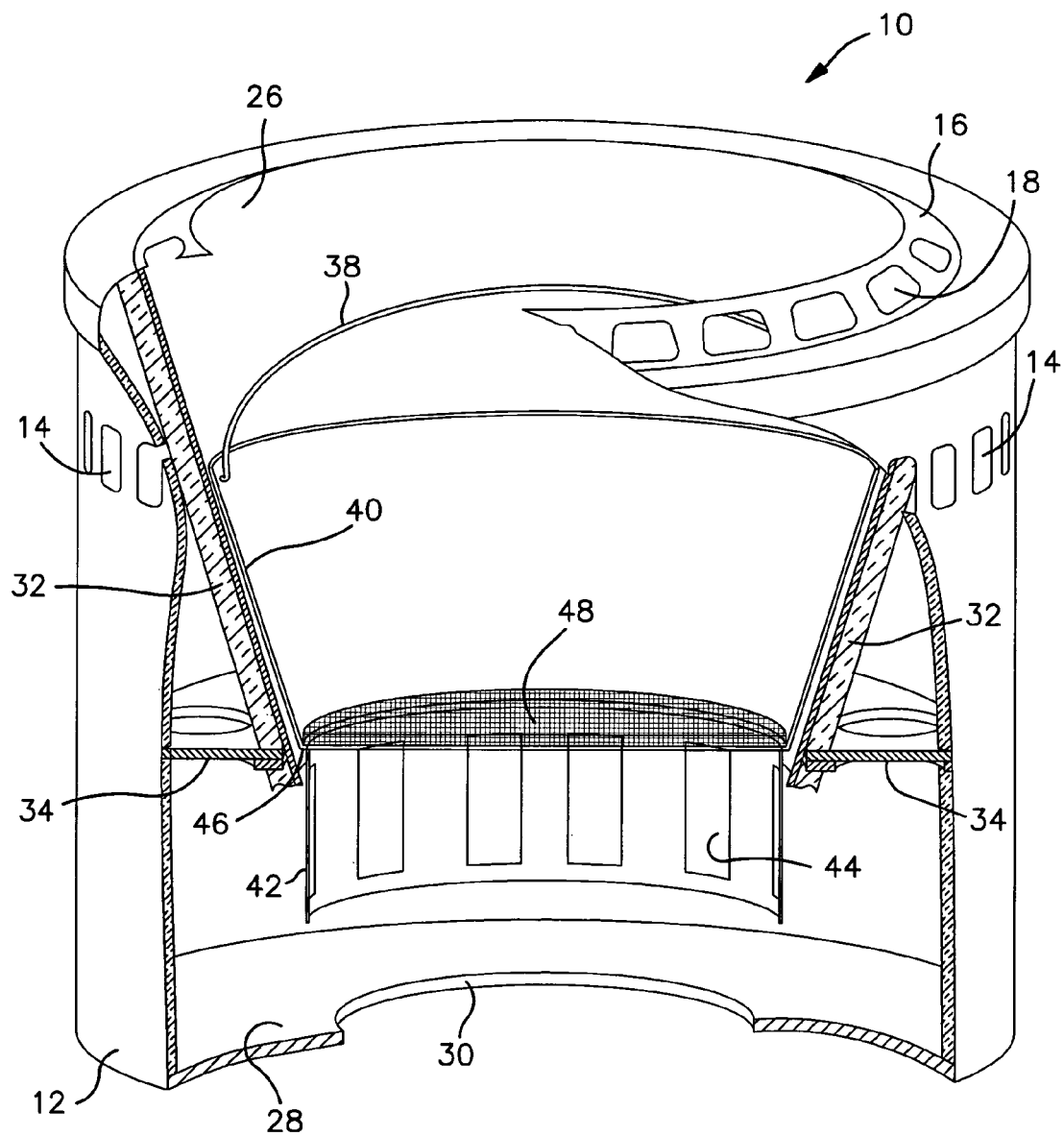
FIG. 2 is a broken cross sectional view of the present invention showing the perforated bottom, the air flow regulator, removable bucket, grate, double walled construction and vented cover.

FIG. 2 is a broken cross section view of the assembled double walled stove 10. It is comprised of an outside wall 12, inside wall in the shape of a truncated cone 26, a bottom 28 with a large central perforation 30, and a removable cover 16 having exhaust vents 18. When the stove 10 is in use, central perforation 30 in bottom 28 is substantially sealed off by the stove 10 being placed on a flat surface. Combustion air is drawn in a multiplicity of rectangular ports 14 as a result of the chimney effect of the combustion. The combustion air passes between outside wall 12 and cone 26 after entering ports 14. This preheats the air, but it still keeps the outside wall 12 cool enough to touch with bare hands. It also prevents wasted heat loss to the ambient air around the stove. This objective is further aided by the presence of insulation 32 around the outside of the cone 26. The air flow regulator is shown in end view at 34. It will be described in more detail later. Disposed within the cone 26 is a removable bucket 36. It is comprised of a handle 38, tapered portion 40 and a lower cylindrical portion 42. The cylindrical portion is perforated by a plurality of apertures 44. When removable bucket 36 is assembled in the stove, a part of the cylindrical portion 42 projects beneath the bottom of cone 26. The apertures are thus exposed to the air flow between outside wall 12 and cone 26. At the intersection 46 of the tapered portion 40 and cylindrical portion 42 of bucket 36 is disposed a grate 48. Grate 48 supports a combustible fuel such as coal (not shown until FIG. 4) in the air flow that passes through apertures 44.

Figure 3:
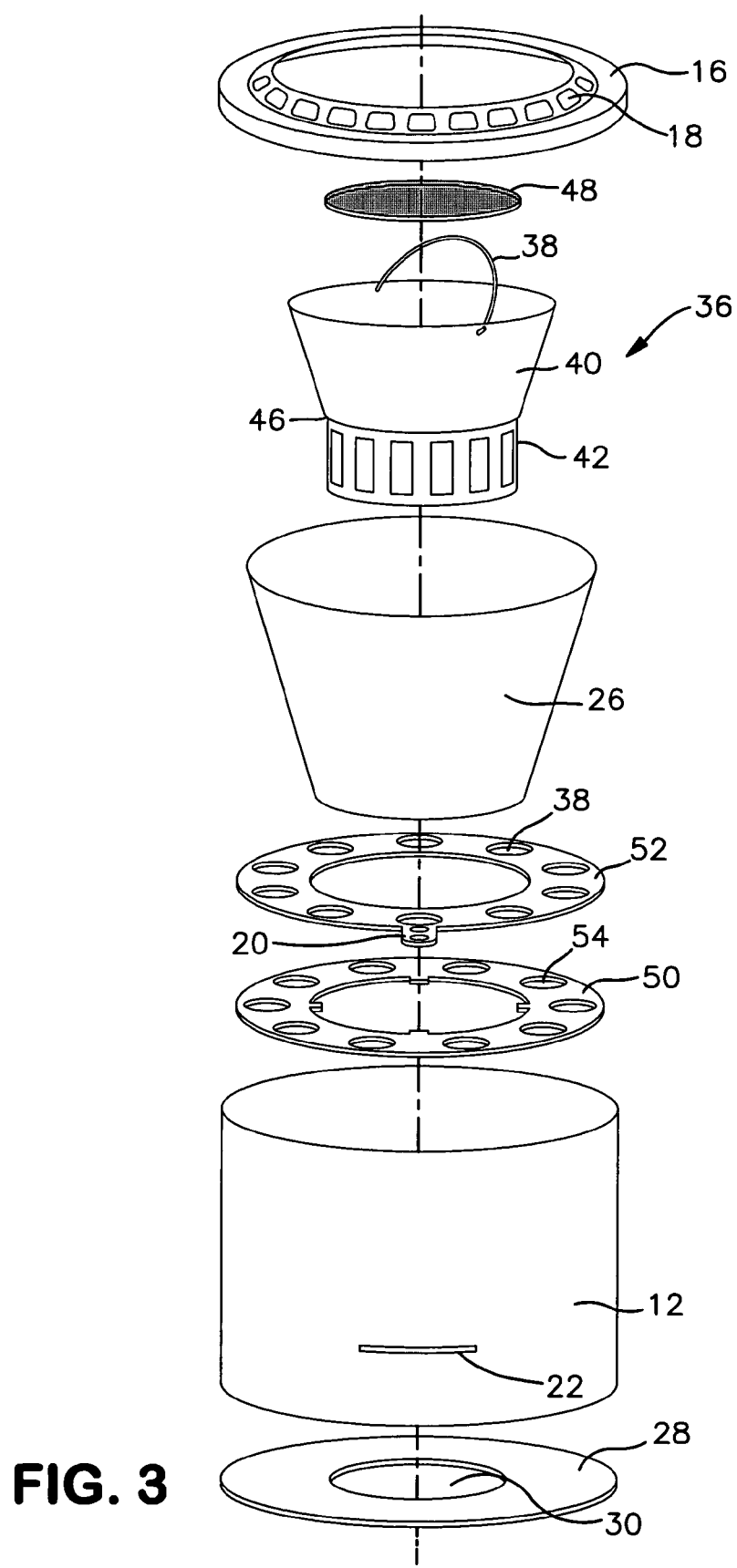
FIG. 3 is an exploded view showing the perforated bottom, outer wall, the plates of the air flow regulator, truncated cone that forms the inner wall of the double wall construction, removable bucket with handle, grate and vented cover.

FIG. 3 is an exploded view showing the bottom 28 with central perforation 30, above which is shown outer wall 12 with, adjusting slot 22. Above that is shown the stationary plate 50 and adjustable plate 52 of the air flow regulator to be described shortly. Further up is truncated cone 26 that forms the inner wall of the double wall construction, and removable bucket 36 with handle 38 upper tapered portion 40 lower cylindrical portion 42, apertures 44, and intersection 46. Above that is grate 48 and removable cover 16 with exhaust vents 18. It should be noted at this point that the diameter of grate 48 has the smallest diameter of any of the components through which combustion air passes, and this results in a venturi effect at the point of the grate, accelerating air flow. The effect is to supply more oxygen to the fuel that is supported on the grate, increasing the temperature of the combustion.

The air flow regulator is an annular pair of plates disposed between outer wall 10 and truncated cone inner wall 26. Stationary plate 50 includes a plurality of perforations 54 and a plurality of tabs 56. These tabs are used to connect stationary plate 50 to the truncated cone 26. Adjustable plate 52 rests on top of stationary plate 50, but is slidable with respect thereto, and contains a plurality of perforations 58. These are substantially identical in number (ten), placement, and diameter to the perforations 54 in stationary plate 50. Adjustable plate 52 further includes air flow regulator adjusting lever 20, which projects through adjusting slot 22 in outer wall 12. The latter better seen in FIG. 1. The air flow regulator works by moving the adjustable plate 52 rotationally with respect to stationary plate 50 to cause the perforations in the two plates to come into registration with each other or not to alter air flow.

Figure 4:
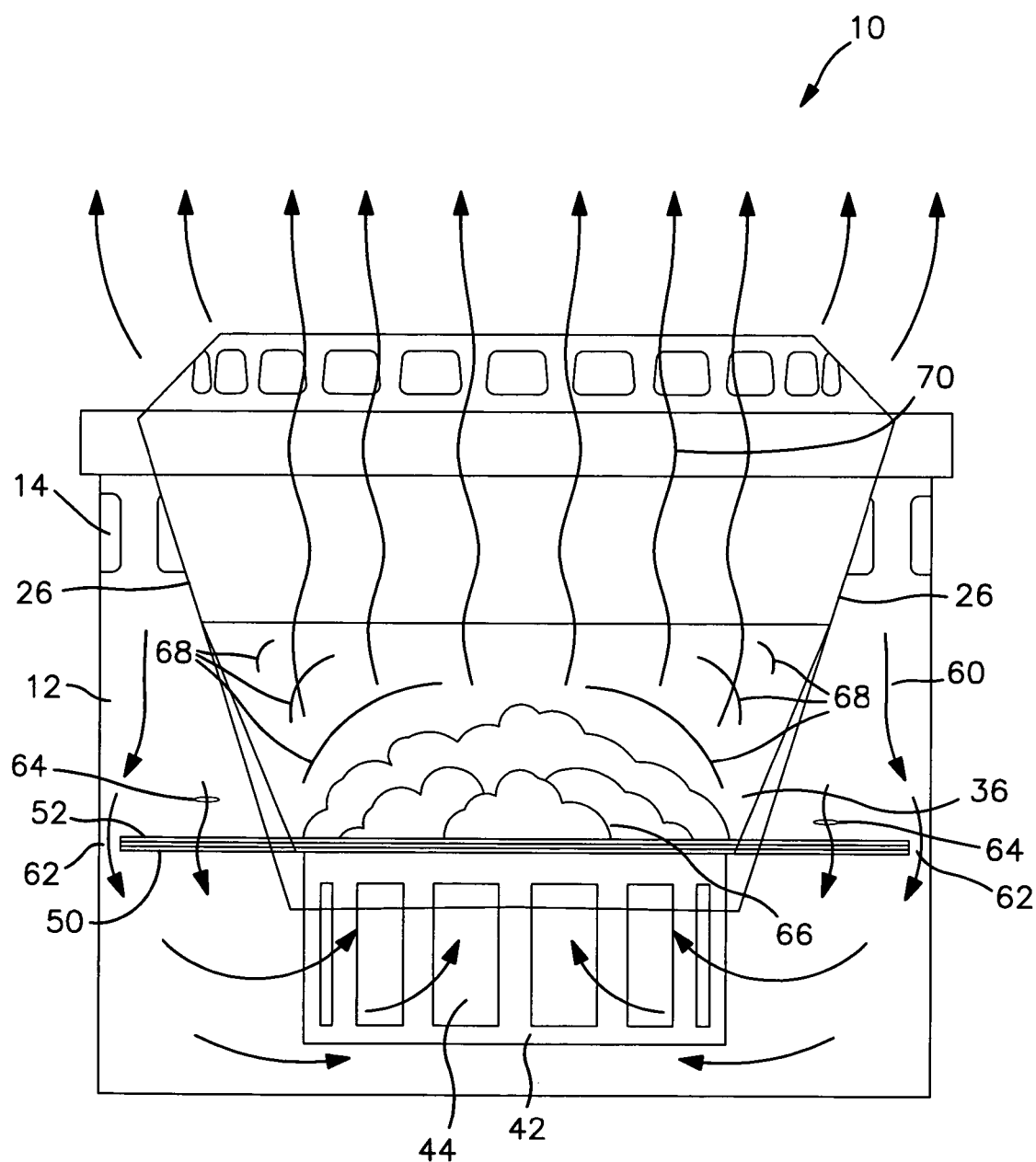
FIG. 4 is a schematic view showing the air flow through the structure of the stove and the combustible fuel on the grate.

FIG. 4 is a schematic view showing the air flow through the structure of the stove and the combustible fuel on the grate. Combustion air is drawn into the stove 10 by the chimney effect of combustion through rectangular ports 14 in outer wall 12. The combustion air then travels downwardly in passageway 60 between outer wall 12 and truncated cone inner wall 26. It will be seen at this point that air flow regulator of stationary plate 50 and adjustable plate 52 does not extend all the way across passageway 60, but leaves an annular opening 62 around its periphery so that closing the regulator fully will not cut off all air flow. It will also be seen that assuming the perforations in plates 50 and 52 are at least partly in registration with each other, that some air flow can proceed through plates 50 and 52 as seen at 64. Air flow then proceeds to enter apertures 44 in the lower cylindrical portion 42 of removable bucket 36. Therein lies combustible fuel 66 which is on fire giving off heat shown at 68. This causes the air to rise at 70 in what is commonly referred to as the chimney effect. This in turn caused more combustion air to be drawn in rectangular port 14, travel down passageway 60, and around to the fuel 66 for continued combustion.

Figure 5:
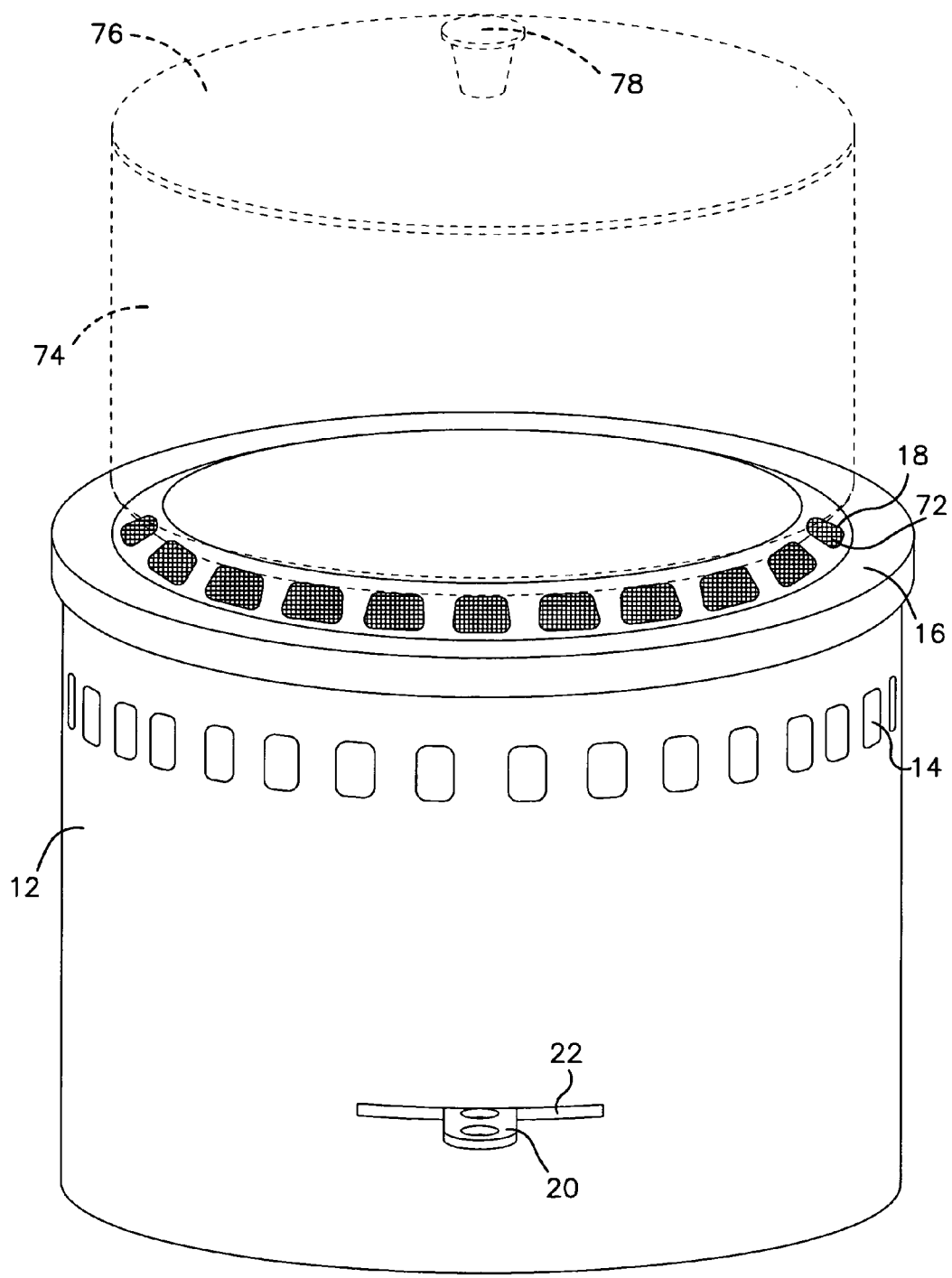
FIG. 5 shows an alternative embodiment of the inventive stove with filtration means in the exhaust vents of the cover, to remove carbon monoxide and other pollutant discharges from combustion.

Turning finally to FIG. 5, it shows an alternative embodiment of the inventive stove with filtration means 72 in the exhaust vents 18 of removable cover 16, to remove carbon monoxide and other pollutant discharges from combustion. It is within the contemplation of the inventors that the filtration means is not limited to a passive filter media, but can extend to a powered system such an electrostatic collector or other powered antipollution systems. Lastly, a cooking pot 74 with lid 76 and handle 78 is shown in phantom to illustrate how a cooking pot would be supported on the top of cover 16.

While the invention has been described, disclosed, illustrated and shown in various terms or certain embodiments or modifications which it has assumed in practice, the scope of the invention is not intended to be, nor should it be deemed to be, limited thereby Such other modifications or embodiments as may be suggested by the teachings herein are particularly reserved, especially as they fall within the breadth and scope of the claims here appended.

What is claimed is:

1. A stove comprising:
   a double walled exterior having at least one port for drawing combustion air into a passageway between the walls;
   a bottom attached about its periphery to the double walled exterior;
   a combustion chamber in communication with the passageway to receive combustion air therefrom, the chamber being surrounded by the double walled exterior and passageway to minimize loss of heat laterally to ambient air and increase heating efficiency and containing a grate to support combustible fuel;
   a cover to support a cooking container and allow venting of exhaust gases;
   the interior of the double wall exterior being shaped as a truncated cone having its largest diameter at the top, and in which a removable bucket is comprised of a tapered portion at its top and a lower cylindrical portion, the cylindrical portion being perforated by at least one aperture, and the tapered portion fitting snugly in the lower portion of the truncated cone such that the cylindrical portion projects beneath the bottom of the truncated cone and into the passageway and the at least one aperture is immersed in combustion air flow in the passageway; and
   the grate being disposed at an intersection of the tapered portion and the cylindrical portion of the removable bucket.

2. The stove of claim 1 in which the grate forms a combustion air flow venturi to increase heating temperature.

3. The stove of claim 1 in which the cover further comprises:
   an annular ring having a large open center, the open center being covered when the stove is in use by a cooking container to heat it; and
   the venting occurring through at least one vent from which heated air exits the stove adjacent sides of the cooking container to further heat it.

4. The stove of claim 1 which further comprises a substantial opening in the center of the bottom of the stove suitable for removal of products of combustion such as ash, and which is substantially sealed off during use of the stove by its placement on a flat horizontal surface.

5. The stove of claim 1 which further comprises an externally adjustable air flow regulator disposed within the passageway.

6. The stove of claim 5 in which the externally adjustable air flow regulator comprises a stationary horizontal annular plate which includes a plurality of perforations and an adjustable horizontal annular plate having an adjusting tab that projects through a slot in an outer surface of the double walled exterior and having a plurality of perforations wherein a number of perforations in the stationary portion equals a number of perforations in the adjustable portion.

7. A stove comprising:
   an outer wall having at least one port for drawing in combustion air;
   a bottom attached about its periphery to the outer wall;
   an inner wall disposed within and substantially concentric with the outer wall, forming between the outer wall and the inner wall a passageway for combustion air flow, the inner wall surrounding a combustion chamber, the combustion air flow in the passageway minimizing heat loss and increasing heating efficiency;
   a removable bucket concentric with and disposed within the inner wall and having a tapered portion at its top and a lower cylindrical portion, the cylindrical portion being perforated by at least one aperture, and the tapered portion fitting snugly in the lower portion of the truncated cone of the inner wall such that the cylindrical portion projects beneath the bottom of the cone of the inner wall and the at least one aperture is immersed in combustion air flow between the inner and outer walls;
   a grate disposed within the removable bucket and at the bottom of the combustion chamber for supporting combustible fuel and forming a combustion air flow venturi increasing heating temperature; and
   an annular ring cover having a large open center, the open center covered when the stove is in use by a cooking container to heat it, and the annular ring having at least one vent from which heated air exits the stove adjacent sides of the cooking container to further heat it.

8. The stove of claim 1 which is sized to be portable even in use and which is cool enough in use to be carried with bare hands because of the combustion air flow in the passageway.

9. The stove of claim 7 in which the inner wall is shaped as a truncated cone with the largest diameter as the top.

10. The stove of claim 7 which further comprises a substantial opening in the center of the bottom of the stove suitable for removal of products of combustion such as ash, and which is substantially sealed off during use of the stove by its placement on a flat horizontal surface.

11. The stove of claim 7 in which the grate is disposed at an intersection of the tapered portion and the cylindrical portion of the removable bucket.

12. The stove of claim 7 which further comprises an externally adjustable air flow regulator disposed within the passageway between the inner and outer walls.

13. The stove of claim 12 in which the externally adjustable air flow regulator comprises a stationary horizontal annular plate which includes a plurality of perforations and an adjustable horizontal annular plate having an adjusting tab that projects through a slot in the outer wall and having a plurality of perforations wherein a number of perforations in the stationary portion equals a number of perforations in the adjustable portion.

14. The stove of claim 7 which is sized to be portable even in use and which is cool enough in use to be carried with bare hands because of the combustion air flow in the passageway.

* * * * *